Aug. 31, 1926.

H. M. BRICE

CHRISTMAS TREE HOLDER

Filed April 4, 1925

1,598,362

INVENTOR.
Hattie M. Brice
BY
ATTORNEY.

Patented Aug. 31, 1926.

1,598,362

UNITED STATES PATENT OFFICE.

HATTIE M. BRICE, OF AKRON, OHIO.

CHRISTMAS-TREE HOLDER.

Application filed April 4, 1925. Serial No. 20,650.

This invention relates to tree holders such as are used to hold Christmas trees.

The chief object of the invention is to provide a simple, inexpensive, but highly effective tree holder for supporting a tree in a vertical position without the use of fastening means for securing it to the floor and adapted to supply the tree with water whereby its greenness and freshness may be preserved for a long period of time, thus obviating the dropping of needles or leaves.

A particular object of the invention is to provide a receptacle of material such as earthenware, cast metal, etc., so shaped as to have a large seating base and being sufficiently heavy so that a tree supported therein cannot tilt it, and to provide an opening in said receptacle and a seat for the bottom end of a tree in the bottom of said receptacle, the opening and the seat being in vertical alignment to support a tree in a vertical position.

Another object is to provide in a receptacle of the kind described above, an inlet, other than the tree opening, whereby water may be supplied to the receptacle to keep the tree green and fresh.

Another object is to provide a tree holder capable of use, when not required to support a tree, as a pot for flowers or plants.

The foregoing and ancillary objects are obtained by the construction illustrated in the accompanying drawings and described in detail below. It is to be understood that the invention is not limited to the specific construction shown and described.

Of the accompanying drawings.

Figure 1:
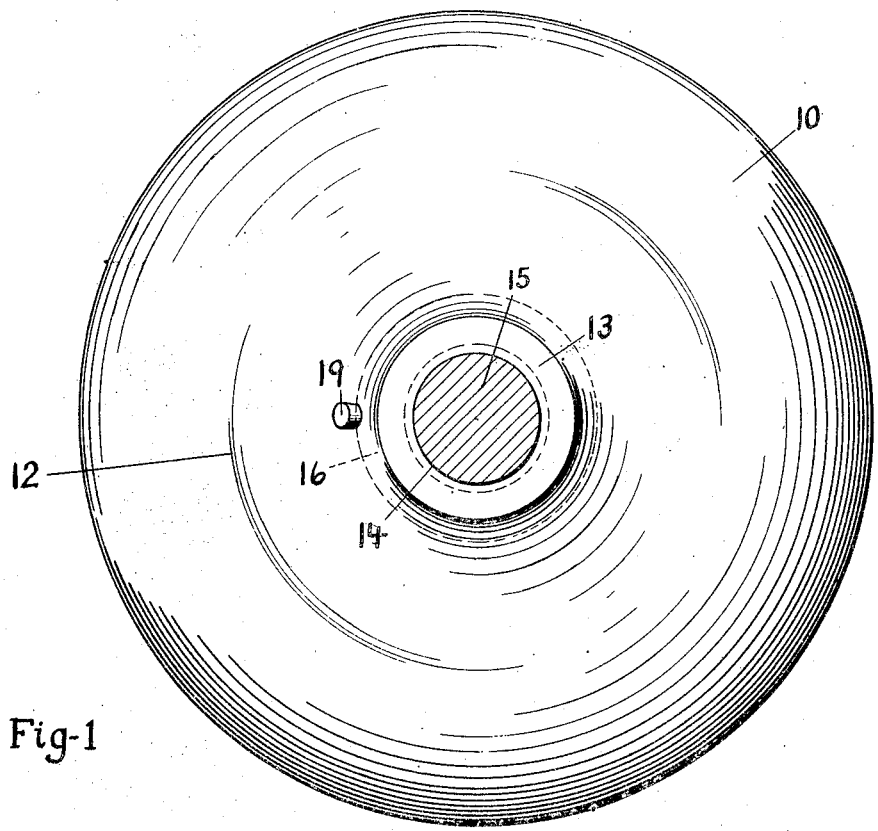
Figure 1 is a plan of a tree holder embodying the invention.
Figure 2:
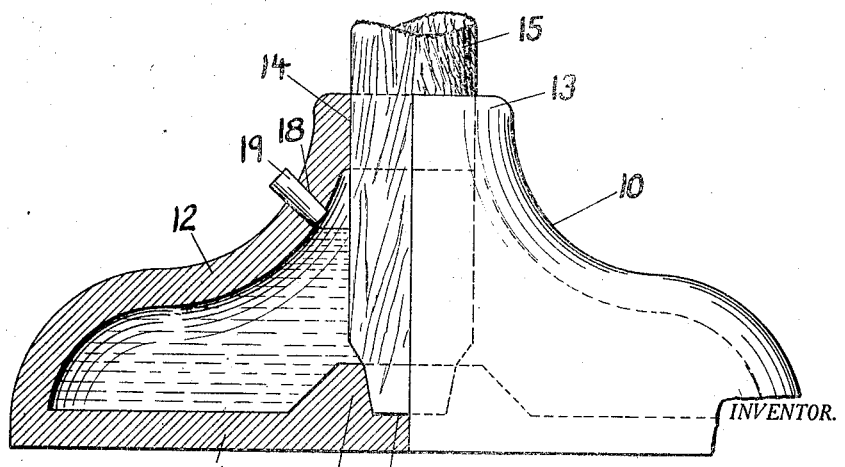
Figure 2 is side elevation thereof, partly in section.

Referring to the drawings, the holder, indicated generally by the numeral 10 is earthenware, stoneware, etc., formed as a receptacle with a large base 11, which may be round as shown or any other desired shape, and with walls 12 and top 13 in which is a substantially central vertical mouth or aperture 14 for receiving the tree, indicated at 15. Vertically below the mouth 14 on the inside of base 11 there is formed an upwardly projecting seat portion 16, having a socket 17 preferably tapering inwardly toward its bottom for receiving the bottom end of tree 15, which may be cut away as shown, to fit into socket 17.

In order that water may be supplied to tree 15, an aperture 18 is provided in holder 10 adjacent the top 13 whereby the holder 10 can be substantially filled with water and the supply maintained while the tree is mounted in the holder. A plug 19 may be employed to close aperture 18, this being particularly desirable when the tree is to be moved about.

In use, the tree will be cutaway at its bottom end substantially as shown, and will be inserted through mouth 14, the bottom end being seated in socket 17. Water will then be supplied to the holder through aperture 18, the supply of water being occasionally replenished while the tree is up.

During the greater part of the year, an ordinary tree holder is of no use. The holder of the present invention is, however, capable for use as an ornamental pot for flowers, plants and the like during the spring, summer and fall.

Modifications of the invention may be resorted to without departing from the spirit thereof or the scope of the appended claim.

What I claim is:

A tree holder, comprising a heavy single-piece, molded earthenware vessel formed with a large base, said vessel having a substantially central reduced mouth, an upwardly projecting seat portion formed in the bottom of said vessel vertically beneath said mouth, said seat portion having a tapering socket therein, said vessel having an aperture therethrough a substantial distance from the bottom thereof through which water may be supplied to the vessel while a tree is supported therein.

HATTIE M. BRICE.